United States Patent [19]

Kressel

[11] 4,206,497
[45] Jun. 3, 1980

[54] FOLDING HEADLIGHT FOR MOTOR VEHICLES

[76] Inventor: Karl Kressel, Albertsplatz 5a, 8630 Coburg, Fed. Rep. of Germany

[21] Appl. No.: 917,507

[22] Filed: Jun. 21, 1978

[30] Foreign Application Priority Data

Jun. 25, 1977 [DE] Fed. Rep. of Germany ....... 2728755

[51] Int. Cl.² .......................... B60P 1/06; F21M 3/18
[52] U.S. Cl. ..................................... 362/65; 362/420; 362/427
[58] Field of Search ..................... 362/65, 83, 61, 63, 362/64, 233, 319, 420, 427

[56] References Cited

U.S. PATENT DOCUMENTS

| | | | |
|---|---|---|---|
| 3,266,336 | 8/1966 | Biabaud | 362/65 |
| 3,532,870 | 10/1970 | Brueder | 362/65 |
| 3,731,079 | 5/1973 | Porsche | 362/65 |
| 3,735,114 | 5/1973 | Porsche | 362/65 |

FOREIGN PATENT DOCUMENTS 1555287  3/1968  France ..................................... 362/65

*Primary Examiner*—Samuel W. Engle
*Assistant Examiner*—Donald P. Walsh
*Attorney, Agent, or Firm*—Max Fogiel

[57] ABSTRACT

A folding headlight for motor vehicles in which the housing holding the main headlights, has a topside which is made at least partially of a light-permeable material. An auxiliary headlight is located within the topside portion of the housing and serves as a light signal. The auxiliary headlight is aligned in the folded position of the housing and has its main beam axis parallel to the longitudinal axis of the vehicle. When viewed in the direction of travel, the auxiliary headlight is located ahead of the main headlights and is displaced upward relative to them. The auxiliary headlight is a broad-band headlight, and the main beam axes of the auxiliary headlight and the main headlight include an angle which corresponds to the tilt angle of the housing. In the extended position of the housing, the light signal is connected to the main headlight which is constructed as a long-distance headlight.

6 Claims, 5 Drawing Figures

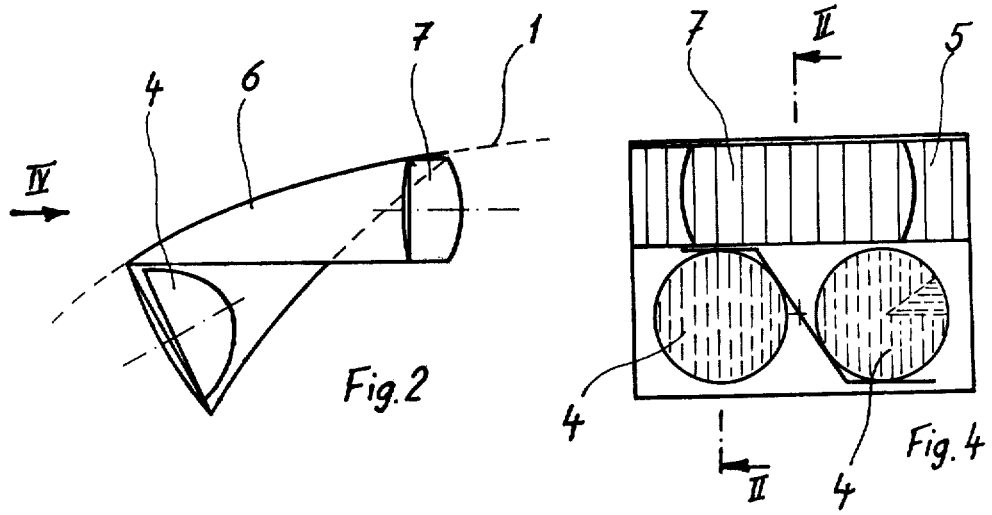
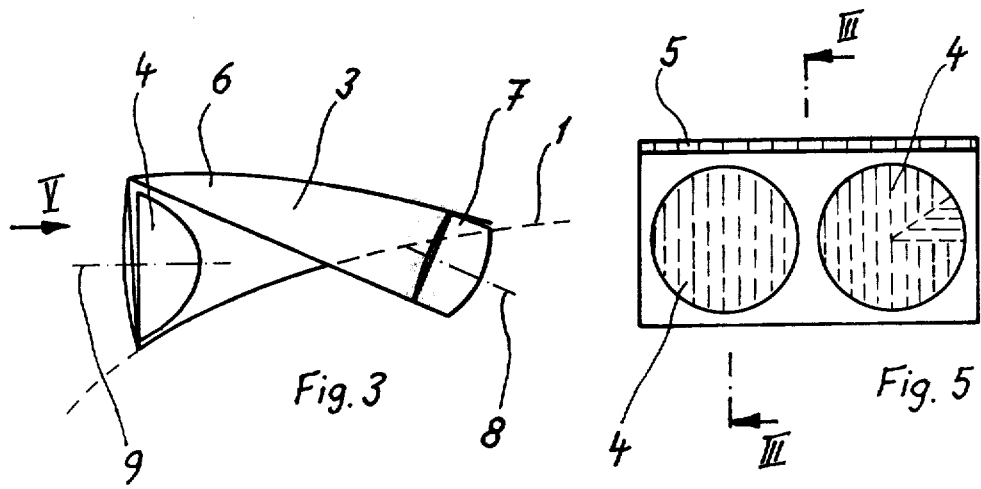

FOLDING HEADLIGHT FOR MOTOR VEHICLES

BACKGROUND OF THE INVENTION

The present invention relates to a folding headlight for motor vehicles.

High-speed motor vehicles have so-called folding headlights which in use are extended manually, electrically, pneumatically or in other ways so that the main headlights are exposed. If the main headlights are not needed, as for example, in the daytime, the housing is folded in so that the chassis surface has a smooth appearance. Such folding headlights offer advantages, particularly from an aerodynamic viewpoint, because of the smooth front section; furthermore, the main headlights are protected during the day against damage from rock impact or dirt.

However, a disadvantage of such folding headlights is that in the folded condition of the housing holding the main headlight, there is no instantly ready light signal available, as required particularly on speedways and turnpikes during over-taking or similar maneuvers, because extending the headlights or the housing holding the main headlights takes too much time. This disadvantage represents a considerable safety risk so that it is necessary with folding headlights to place headlights used as signal lights in the zone of the front section, as for example, in the grill or in the bumper, which involves considerable costs.

This is remedied by the present invention. It is the object of the present invention to provide a folding headlight for motor vehicles which even in the folded condition of the housing is immediately ready for use as light signal and which, nevertheless, results in savings.

SUMMARY OF THE INVENTION

This object is achieved by locating inside the folding housing holding the main headlight(s), the top of which housing is made of a light-permeable material, an auxiliary headlight which acts as light signal and which is aligned parallel to the main beam axis in the folded position of the housing. This auxiliary headlight which is used as light signal is an integral part of the housing holding the main headlights. Viewed in the direction of travel, the auxiliary headlight is located ahead of the main headlight(s) and displaced upward relative to them. In this manner, the auxiliary headlight when operated as a light signal is perfectly visible for other traffic participants. Part of the invention is that the auxiliary headlight is designed as a broad-band headlight further improving its warning function when in operation. It is advantageous if the main beam axes of the auxiliary headlight and of the main headlights form an angle which corresponds to the folding (tilt) angle of the housing. In this manner, the main beam axis or axes of the main headlight(s) in the extended condition of the housing are aligned parallel to the longitudinal axis of the vehicle. Furthermore, it is part of the invention that the light signal in the extended condition of the housing is wired to the main headlight which is designed as a long-distance headlight. Hence in the extended condition, the auxiliary headlight is without current, while the long-distance headlight performs the warning function when the light signal is actuated.

BRIEF DESCRIPTION OF THE DRAWINGS

The invention will be explained more fully by referring to the drawing. The drawing shows:

FIG. 2 is a partial view of the folding headlight in the folded condition according to section line II—II in FIG. 4;

FIG. 3 is the folding headlight in a partial view in the unfolded or extended condition according to section line III—III in FIG. 5;

FIG. 4 is a front view of the folding headlight in the folded condition according to view IV in FIG. 2; and FIG. 5 is a front view of the folding headlight in the extended condition according to view V in FIG. 3.

DESCRIPTION OF THE PREFERRED EMBODIMENTS

Figure 1:
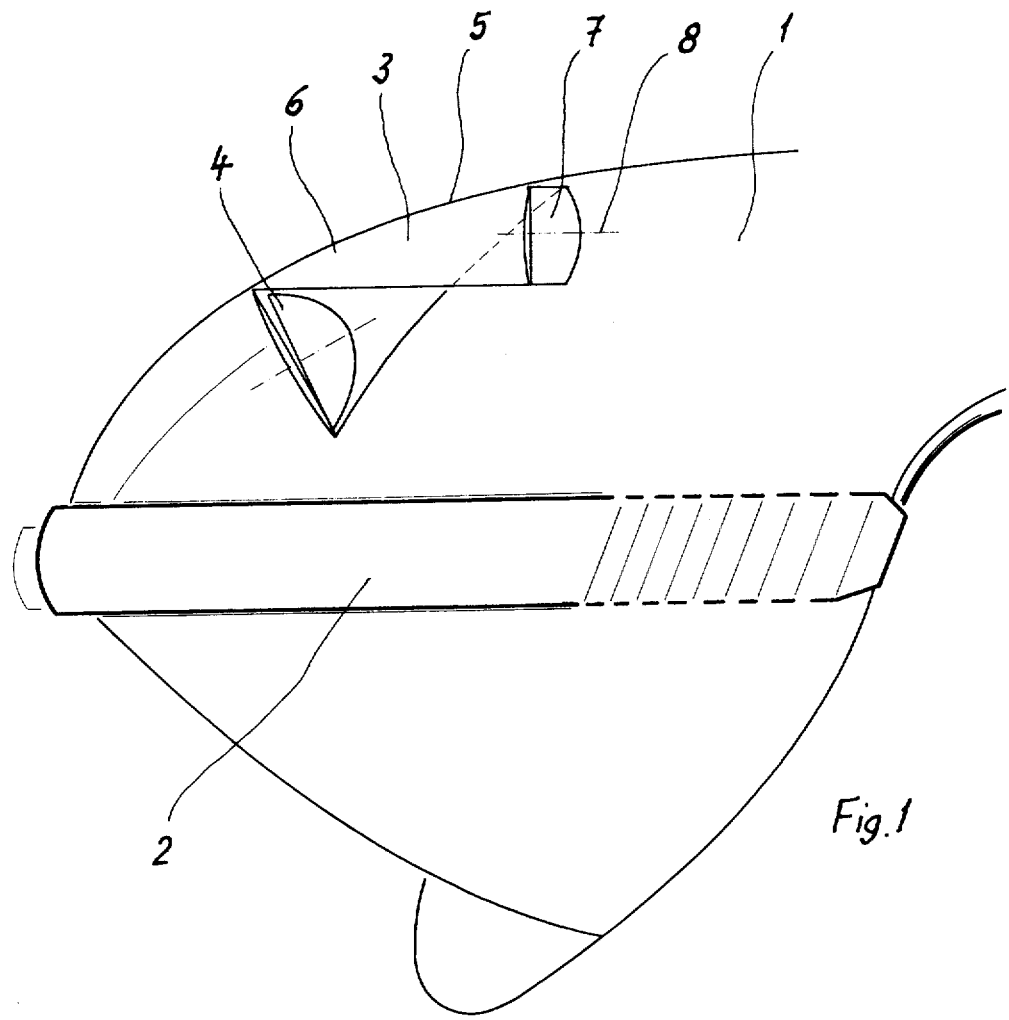
FIG. 1 is a sideview schematic of the front part of a motor vehicle with the folding headlight folded.

In FIG. 1, 1 denotes the front part of the chassis of a motor vehicle while 2 represents the front bumper. In the front part of chassis 1, the schematic shows folding headlights 3 (only one is shown) which consist of a housing tiltable about an axis (not shown); this housing accommodates the main headlight 4. As indicated by FIGS. 4 and 5, there are two main headlights 4 where one main headlight 4, in FIGS. 4 and 5 the left one seen from the front, is used as high beam while the other main headlight is used as low beam. The topside 5 of the tiltably mounted housing 6 is at least partially made of light-permeable material. In the rear portion of the folding headlight 3 or of housing 6 and, seen in the direction of travel, ahead of the main headlight(s) 4, an auxiliary headlight 7 is located which, as shown particularly by FIG. 4, is designed as a broad-band headlight. This auxiliary headlight 7 in the folded condition according to FIGS. 1 and 2 serves as a light signal. In this condition, hence with folded housing according to FIGS. 1 and 2, the main beam axis 8 of the auxiliary headlight 7 is aligned essentially parallel to the vehicle longitudinal axis so that upon actuation of the auxiliary headlight 7 as light signal, other drivers may be warned (signaled) also in the folded condition of the housing 6.

If, as shown in FIG. 3, during twilight or night, the folding headlight 3 or the housing 6 is extended, the main headlights 4 get into a position in which their main beam axes 9 are aligned essentially parallel to the vehicle longitudinal axis. In the extended condition of the housing 6, the light signal is connected by means of suitable circuit measures in such a way that it acts on the high-beam headlight(s) 4 while the auxiliary headlight 7 in the extended condition of the housing 6 is contactless or currentless. FIGS. 1 to 3 clearly indicate that the main beam axes 8 and 9 of the auxiliary headlight 7 and of main headlights 4 make an angle which corresponds to the tilt angle of housing 6. It should be pointed out that the chassis 1 in FIGS. 2 and 3 is shown by dotted lines. Furthermore, it is clear from FIGS. 1 and 2 that the auxiliary headlight 7 in the folded condition of housing 6 is displaced relative to the main headlights 4 so that it is not covered by the main headlights in the folded condition of housing 6.

The construction of the folding headlight in accordance with the present invention has considerable advantages over previously known systems. Through the integrated construction of the light signal with the main headlights, the additional installation of special light signal headlights in the front grill or in the bumper becomes superfluous, resulting in considerable savings. Furthermore, the auxiliary headlights which are integral with the main headlights, are at a protected location so that damage during less serious collisions is eliminated. The cabling and final installation are much simpler; additional housings and additional mountings are not required, so that the costs are further reduced. Finally, because of the absence of separate light signal headlights in the front section of the vehicle, better aerodynamic properties result.

I claim:

1. A folding headlight for a motor vehicle, comprising: a housing with folded and unfolded positions; at least one main headlamp held by said housing; said housing being at least partially of a light-permeable material; at least one auxiliary headlamp in said housing and providing a light signal, said auxiliary head lamp being aligned in a folded position of said housing with a main beam axis of said auxiliary headlamp being parallel to a longitudinal axis of said motor vehicle; said housing being pivotable about an axis perpendicular to the lengthwise axis of said vehicle; said main headlamp and said auxiliary headlamp being alternately energizable with current depending on whether the housing is in the unfolded or folded position, said auxiliary headlamp being arranged relative to said main headlamp so that when said housing is in the folded position said main headlamp is retracted and said auxiliary headlamp is in a state of readiness for replacing said main headlamp in providing light signal, said main headlamp being energizable for emitting light in the unfolded position and said auxiliary headlamp being energizable for emitting light in the folded position.

2. A folding headlight as defined in claim 1 wherein said auxiliary headlamp is located ahead of said main headlamp and displaced upward relative to said main headlamp when viewed in the direction of travel.

3. A folding headlight as defined in claim 1 wherein said auxiliary headlamp is a substantially broad-band headlamp.

4. A folding headlight as defined in claim 1 wherein said auxiliary headlamp and said main headlamp have beam axes which include an angle corresponding to a tilt angle of said housing.

5. A folding headlight as defined in claim 1 wherein said light signal is connected to said main headlamp in an extended position of said housing, said main headlamp being a long-distance headlamp.

6. A folding headlight as defined in claim 1 wherein said auxiliary headlamp is located ahead of said main headlamp and displaced upward relative to said main headlamp when viewed in the direction of travel; said auxiliary headlamp being a substantially broad-band headlamp; said auxiliary headlamp and said main headlamp having beam axes which include an angle corresponding to a tilt angle of said housing; said light signal being connected to said main headlamp in the unfolded position of said housing, said main headlamp being a long-distance headlamp.

* * * * *